US012572287B2

(12) United States Patent
Hush

(10) Patent No.: US 12,572,287 B2
(45) Date of Patent: Mar. 10, 2026

(54) SENSE AMPLIFIERS AS STATIC RANDOM ACCESS MEMORY

(71) Applicant: Micron Technology, Inc., Boise, ID (US)

(72) Inventor: Glen E. Hush, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 127 days.

(21) Appl. No.: 18/402,990

(22) Filed: Jan. 3, 2024

(65) Prior Publication Data

US 2024/0256156 A1     Aug. 1, 2024

Related U.S. Application Data

(60) Provisional application No. 63/442,184, filed on Jan. 31, 2023.

(51) Int. Cl.
*G06F 3/06* (2006.01)

(52) U.S. Cl.
CPC .......... G06F 3/0626 (2013.01); G06F 3/0629 (2013.01); G06F 3/0673 (2013.01)

(58) Field of Classification Search
CPC .... G06F 3/0626; G06F 3/0629; G06F 3/0673; G11C 7/067; G11C 8/14; G11C 16/26
USPC ....................................... 365/185.21, 185.24
See application file for complete search history.

(56) References Cited

U.S. PATENT DOCUMENTS

| | | | |
|---|---|---|---|
| 7,164,596 B1 | 1/2007 | Deng | |
| 7,969,765 B2 | 6/2011 | Sekiguchi | |
| 2014/0241087 A1* | 8/2014 | Katoch | G11C 11/419 |
| | | | 365/208 |
| 2016/0240242 A1* | 8/2016 | Son | G06F 3/0673 |
| 2018/0144797 A1* | 5/2018 | Kitagawa | G11C 13/0002 |
| 2019/0171520 A1* | 6/2019 | Cadigan | G11C 29/52 |
| 2020/0227123 A1* | 7/2020 | Salahuddin | H10D 1/62 |
| 2020/0286532 A1* | 9/2020 | Abiko | G11C 16/26 |
| 2021/0005243 A1* | 1/2021 | Bae | G11C 11/4094 |
| 2021/0225434 A1* | 7/2021 | Lu | G11C 5/147 |
| 2021/0295893 A1* | 9/2021 | Lu | G11C 11/4074 |
| 2021/0407558 A1* | 12/2021 | Wang | G11C 7/06 |
| 2022/0020435 A1* | 1/2022 | Moschiano | G11C 7/12 |
| 2022/0246199 A1* | 8/2022 | Lu | G11C 11/4096 |
| 2022/0319575 A1* | 10/2022 | Lee | G11C 11/4097 |

* cited by examiner

*Primary Examiner* — Michael T Tran
(74) *Attorney, Agent, or Firm* — Brooks, Cameron & Huebsch, PLLC

(57) ABSTRACT

Methods, systems, and devices related to sense amplifiers of a memory device serving as a Static Random Access Memory (SRAM) resource. For example, a memory array of a memory device can be coupled to sense amplifiers. The sense amplifiers can be electrically disconnected from digit lines of the memory array. Data can be stored in the sense amplifiers. The data can be communicated from the sense amplifiers to a processing device external to the memory array and the sense amplifiers. The sense amplifiers can receive data from the processing device and, when electrically disconnected from the number of digit lines, store the received data.

20 Claims, 3 Drawing Sheets

SENSE AMPLIFIERS AS STATIC RANDOM ACCESS MEMORY

PRIORITY INFORMATION

This application claims the benefit of U.S. Provisional Application No. 63/442,184, filed on Jan. 31, 2023, the contents of which are incorporated herein by reference.

TECHNICAL FIELD

The present disclosure relates generally to semiconductor memory and methods, and more particularly, to apparatuses, systems, and methods of using sense amplifiers of a memory device as a Static Random Access Memory (SRAM) resource.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes Random Access Memory (RAM), Dynamic Random Access Memory (DRAM), Static Random Access Memory (SRAM), Synchronous Dynamic Random Access Memory (SDRAM), and Thyristor Random Access Memory (TRAM), among others. Non-volatile memory can provide persistent data by retaining stored data when not powered and can include NAND flash memory, NOR flash memory, Ferroelectric Random Access Memory (FeRAM), and resistance variable memory such as Phase Change Random Access Memory (PCRAM), Resistive Random Access Memory (RRAM), and Magnetoresistive Random Access Memory (MRAM), such as Spin Torque Transfer Random Access Memory (STTRAM), among others.

Electronic systems include processing resources (e.g., one or more host processors and/or controllers) coupled to memory devices, which may retrieve and execute instructions and store the results of the executed instructions to a suitable location. The processing resource(s) can be external to the memory devices and coupled thereto via one or more busses, for example. A processor may include functional units such as arithmetic logic unit (ALU) circuitry, floating point unit (FPU) circuitry, and/or a combinatorial logic block, for example, which may be used to execute instructions by performing logical operations such as AND, OR, NOT, NAND, NOR, and XOR, and invert (e.g., inversion) logical operations on data (e.g., one or more operands).

DETAILED DESCRIPTION

Figure 1:
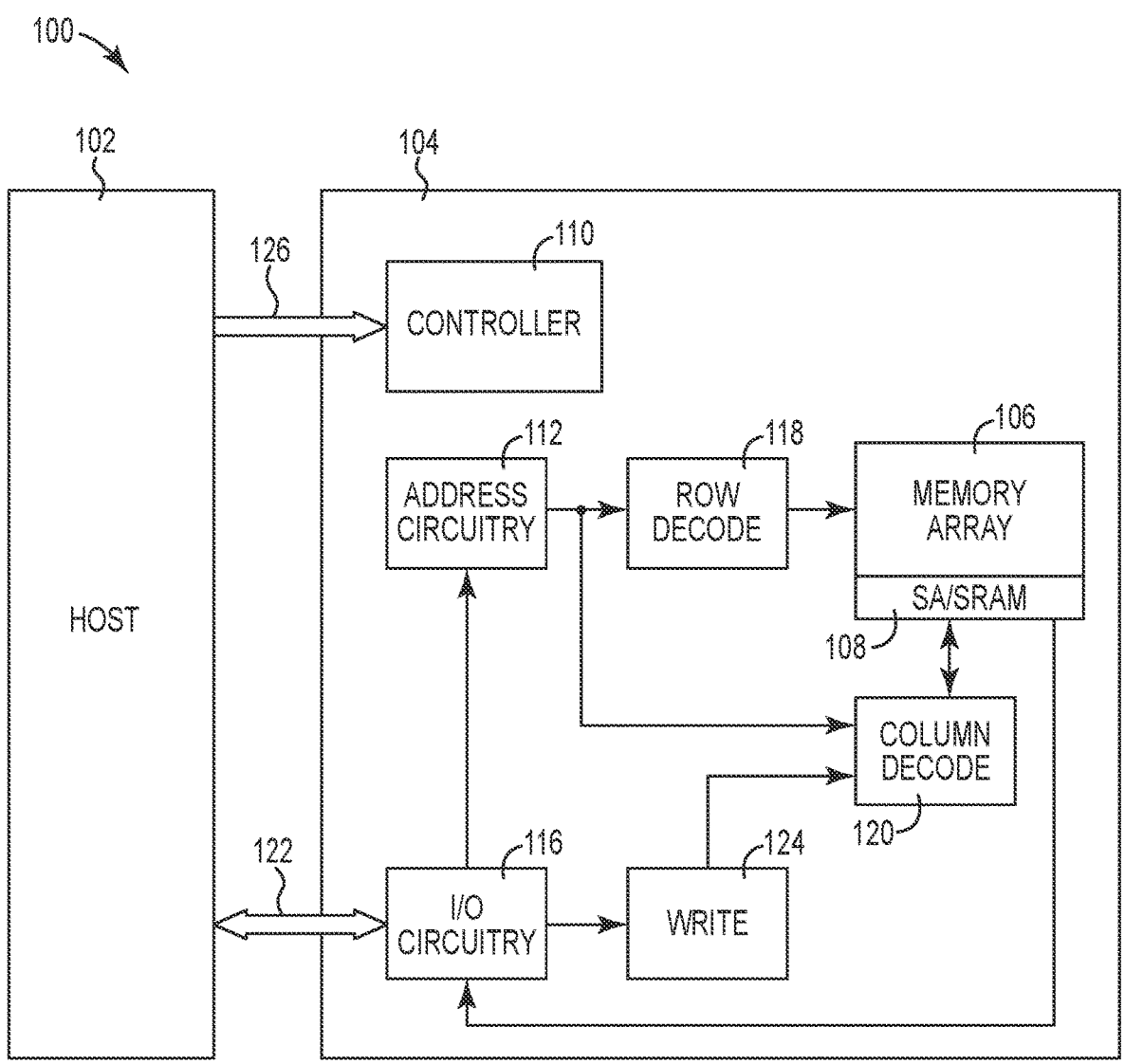
FIG. 1 is a block diagram of an apparatus in the form of a computing system including a memory device in which sense amplifiers can serve as a SRAM array in accordance with a number of embodiments of the present disclosure.

Systems, apparatuses, and methods related to using sense amplifiers of a memory device as a Static Random Access Memory (SRAM) resource (e.g., a SRAM array) are described. A memory device coupled to a host can include a memory resource (e.g., a DRAM array) that is used by the host as main memory. In some previous approaches, a memory device may include a memory resource (e.g., a SRAM array), which can be used as registers, cache, and table storage, etc. for example, that is separate and distinct from another memory resource (e.g., a DRAM array) used as main memory. A SRAM array can be used for registers, cache, and table storage, etc., for example, because a SRAM array can provide faster access than other memory types (e.g., a DRAM array). However, a SRAM array can be more expensive than a DRAM array. A host, such as a processing device, can utilize different memory layers such as main memory and one or more layers of cache memory (e.g., L1 cache, L2 cache, L3 cache, etc.), for instance. Including multiple memory resources or multiple types of memory resources (for main memory and cache, for instance) may increase the physical size of the memory device to provide space for the memory resources (e.g., DRAM and SRAM arrays). Non-limiting examples of costs associated with a memory device having multiple memory resources or multiple types of memory resources include increased resource consumption, increased power consumption, and increased latency. As such, it can be beneficial to reduce how many SRAM arrays included in a memory device.

Aspects of the present disclosure address the above and other deficiencies of previous approaches by using sense amplifiers coupled to a memory resource, such as a DRAM array, as a SRAM resource (e.g., a SRAM array). Because sense amplifiers may not always be in use during operation of a memory device, embodiments of the present disclosure take advantage of the availability of the sense amplifiers to serve as a SRAM resource (e.g., by a host). The physical size of a memory device can be reduced because using the sense amplifiers as a SRAM array may effectively eliminate (replace) a SRAM array that may otherwise exist (e.g., on the memory device). That is not to say that embodiments of the present disclosure are limited to memory devices that do not include a SRAM array. Resource consumption of a memory device can be reduced because the sense amplifiers are being utilized as a SRAM array when the sense amplifiers would otherwise be idle (underutilized) and the sense amplifiers may effectively eliminate (replace) a SRAM array of a memory device.

Some memory arrays, such as a DRAM array, may be refreshed. Refreshing of a memory array can involve using sense amplifiers coupled thereto. To avoid interfering with refreshing of a memory array when sense amplifiers are serving as a SRAM array, some embodiments include transferring data stored in sense amplifiers to the memory array coupled thereto during a refresh. By transferring the data to the memory array (at least temporarily), the data can be preserved while the sense amplifiers are utilized for the refresh. When the refresh is completed, the data can be transferred back to the sense amplifiers.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like. The terms "data" and "data values" are used interchangeably herein and can have the same meaning, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, element 108 can represent element 8 in FIG. 1, and a similar element can be labeled 208 in FIG. 2. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 104 in which sense amplifiers 108 can serve as a SRAM array in accordance with a number of embodiments of the present disclosure. As used herein, a memory device 104, a memory array 106, and/or sense amplifiers (SA in FIG. 1) 108 might also be separately considered an "apparatus." For clarity, the computing system 100 has been simplified to focus on features with particular relevance to the present disclosure (providing the host 102 with capabilities associated with an SRAM resource via the sense amplifiers 108, for instance). The sense amplifiers 108 are labeled as "SA/SRAM" to reflect that the sense amplifiers 108 can serve as sense amplifiers (e.g. operate in a mode) and a SRAM array (e.g., operate in a different mode). Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

The computing system 100 includes a host 102 coupled (e.g., connected) to the memory device 104, which includes the memory array 106. The computing system 100 can be a component or a resource of a personal laptop computer, a desktop computer, a digital camera, a smart phone, or a memory card reader, for example, among various other types of electronic devices. The host 102 can be or include a processing device, such as an CPU. The host 102 can include a system motherboard and/or backplane and can include one or more processing devices (e.g., one or more processors such as an CPU, microprocessors, controlling circuitry). The computing system 100 can include the host 102 and the memory device 104 as separate and distinct integrated circuits or the host 102 and the memory device 104 as components on the same (a single) integrated circuit (e.g., the host 102 on-chip with the memory device 104). In some embodiments, the memory device 104 can include components coupled to respective substrates and those substates can be coupled to another substrate, such as a printed circuit board (PCB). The computing system 100 can be, for instance, a component or a resource of a server system and/or a high performance computing (HPC) system and/or a portion thereof.

The memory array 106 can be a DRAM array, SRAM array, STT RAM array, PCRAM array, TRAM array, RRAM array, FeRAM array, NAND flash array, and/or NOR flash array, for instance. A FeRAM array can include ferroelectric capacitors and can perform bit storage based on an amount of charge stored thereon. The memory array 106 can comprise memory cells arranged in rows coupled by access lines (which may be referred to herein as word lines or select lines) and columns coupled by sense lines. Although a single memory array 106 is shown in FIG. 1, embodiments are not so limited. For instance, the memory device 104 can include one or more memory arrays 106 (e.g., a number of banks of DRAM cells).

The memory device 104 can include address circuitry 112 to latch address signals provided over an I/O bus 122 (e.g., a data bus) through I/O circuitry 116. Address signals can be received and decoded by a row decoder 118 and a column decoder 120 to access the memory array 106. Data can be read from the memory array 106 by sensing voltage and/or current changes on the digit lines using the sense amplifiers 108. As described herein, the sense amplifiers 108 can be one or more sense amplifier stripes. The sense amplifiers 108 can be used to read and latch a page (e.g., row) of data from the memory array 106. The I/O circuitry 116 can be used for bi-directional data communication with the host 102 over the I/O bus 122. The write circuitry 124 can be used to write data to the memory array 106.

A controller 110 can decode signals provided by a control bus 126 from the host 102. These signals can include chip enable signals, write enable signals, and address latch signals that are used to control operations performed on the memory array 106, including data read, data write, and data erase operations. In various embodiments, the controller 110 can be responsible for executing instructions from the host 102. The controller 110 can be a state machine, a sequencer, or some other type of controller.

In some embodiments, the sense amplifiers 108 can be used to perform logical operations using data stored in the memory array 106 and/or data stored in the sense amplifiers 108 as inputs and store the results of the logical operations the memory array 106 and/or data stored in the sense amplifiers 108 without transferring data via a sense line address access (e.g., without firing a column decode signal). As such, various compute functions can be performed using, and within, the sense amplifiers 108 rather than (or in association with) being performed by processing resources external to the sense amplifiers 108 (e.g., by a processor associated with the host 102 and/or other processing circuitry, such as ALU circuitry, of the memory device 104 (e.g., of the controller 110 or elsewhere)).

As described herein, the sense amplifiers 108 can operate as conventional sense amplifiers in a first mode (also referred to herein as a sense amplifier mode), for example, in association with sensing (e.g., reading) data stored in the memory array 106 and/or writing data to the memory array 106. In various embodiments, the sense amplifiers 108 can operate as SRAM in a second/different mode (also referred to herein as a SRAM mode) in which the sense amplifiers serve as respective SRAM cells. When operated in a SRAM mode, the sense amplifiers 108 can be accessed independently of the memory array 106 (e.g., by the host 102). As described further below, the sense amplifiers 108 can switch between operation modes. For example, data stored in the sense amplifiers while being operated in SRAM mode (e.g., SRAM data) can be temporarily moved to the memory array 106 such that the data stored in the memory array 106 can be refreshed prior to the SRAM data being returned to the sense amplifiers from the memory array 106.

As described herein, embodiments of the present disclosure utilize the sense amplifiers 108 to provide the processing device with a capability associated with an SRAM resource coupled to the host 102. The sense amplifiers 108 can be isolated (e.g., electrically disconnected) from one or more digit lines of the memory array 106 and/or capacitance of one or more digit lines of the memory array 106. For instance, the sense amplifiers 108 can be disconnected from digit lines of the memory array 106 when the digit lines are not active (e.g., not turned on). The sense amplifiers 108 can be disconnected from capacitance of via a transistor coupled to the sense amplifiers 108 and the digit lines of the memory array 106. The sense amplifiers 108 can store data from the host 102 when isolated from the memory array 106.

Non-limiting examples of capabilities associated with an SRAM resource include storing data such as global variables, stacks, and instructions for the host 102; communicating data to the host 102; and receiving data from the host 102. The sense amplifiers 108 can serve as (e.g., provide capabilities associated with) an SRAM resource (e.g., SRAM array). For example, data stored in the sense amplifiers 108 can be communicated to the host 102 and data from the host 102 can be stored in the sense amplifiers 108.

In some embodiments, the memory array 106 may be refreshed in association with operation of the memory device 104. A non-limiting example of a type of memory array that is refreshed in association with operation of the memory device is a DRAM array. The memory array 106 can be a DRAM array. Refreshing the memory array 106 can include using the sense amplifiers 108 such that data stored in the sense amplifiers 108 may be lost (e.g., overwritten) as a result of refreshing the memory array 106. To avoid losing data as a result of refreshing the memory array 106, data stored by the sense amplifiers 108 can be transferred and stored in the memory array 106 (at least temporarily) in advance of and during the refresh. After the refresh is complete, the sense amplifiers 108 can sense the data (previously stored in the sense amplifiers 108) and/or other data from the memory array 106. In some embodiments, data stored by the sense amplifiers 108 can be transferred and stored in a row of memory cells (also referred to herein as a row) of the memory array 106. The row can be dedicated for storage of such data during a refresh of the memory array 106. For example, the row of the memory array 106 can be associated with an address space of the memory array 106 that is dedicated to storage of data transferred from the sense amplifiers 108 during refreshing the memory array 106.

The controller 110 can cause one or more of the sense amplifiers 108 to operate in a first (sense amplifier) mode in association with sensing data stored in the memory array 106 and cause one or more of the sense amplifiers 108 to operate in a second (SRAM) mode in association with serving as a SRAM array. The controller 110 can cause those sense amplifiers 108 operating in the second mode to be electrically disconnected from the memory array 106. The controller 110 can cause data received by the memory device 104 from the host 102, for example, to be stored by those sense amplifiers 108 operating in the second mode. In the second mode, the sense amplifiers 108 can be disconnected from digit lines of the memory array 106 when the digit lines are not active (e.g., not turned on). The controller 110 can cause data stored in those sense amplifiers 108 operating in the second mode to be communicated to the host 102 (e.g., in response to a host command). The controller 110 can cause, in advance of a refresh of the memory array 106, those sense amplifiers 108 operating in the second mode to switch to operating in the first mode and copy data stored in those sense amplifiers 108 to the memory array 106.

Figure 2:
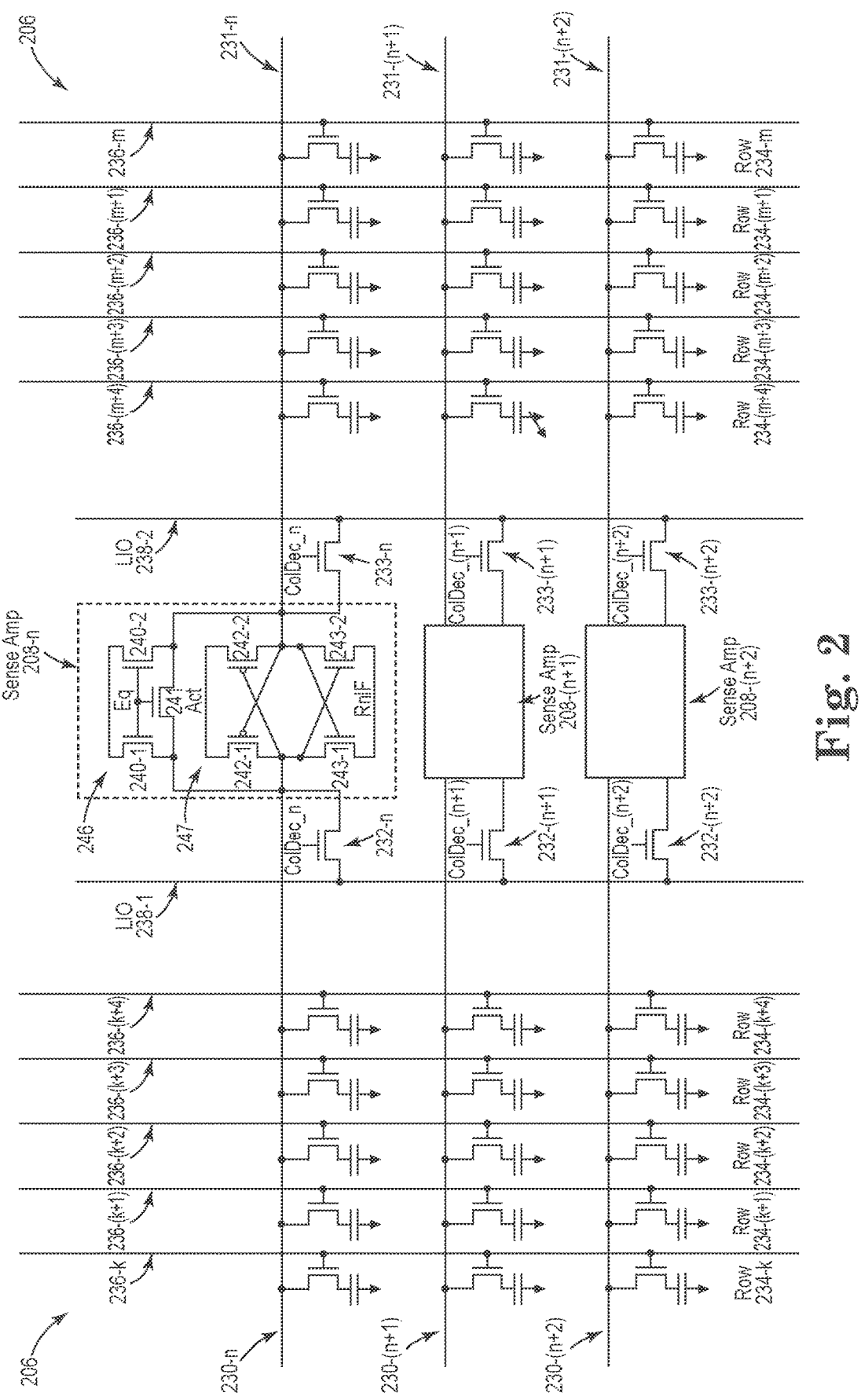
FIG. 2 is a schematic diagram illustrating rows of memory cells of a memory array and sense amplifiers that can serve as a SRAM array in accordance with a number of embodiments of the present disclosure.

FIG. 2 is a schematic diagram of rows 234 of memory cells of a memory array 206 and sense amplifiers 208 that can serve as a SRAM array in accordance with a number of embodiments of the present disclosure. The memory array 206 includes a first subset including rows of memory cells 234-$m$, 234-($m$+1), 234-($m$+2), 234-($m$+3), and 234-($m$+4) coupled to respective word lines (e.g., 236-$m$, 236-($m$+1), 236-($m$+2), 236-($m$+3), and 236-($m$+4), respectively). The memory array 206 includes a second subset portion including rows of memory cells 234-$k$, 234-($k$+1), 234-($k$+2), 234-($k$+3), and 234-($k$+4) comprising memory cells coupled to respective word lines (e.g., 236-$k$, 236-($k$+1), 236-($k$+2), 236-($k$+3), and 236-($k$+4)). As used herein, "subset" is used for identification purposes and does not necessarily imply physical or logical characteristics (e.g., boundaries) of the memory array 206. The rows of the subarrays are referred to collectively as the rows 234 and the word lines of the subarrays are referred to collectively as the word lines 236.

The memory array 206 includes columns of memory cells corresponding to respective complementary digit line pairs 230-$n$/231-$n$, 230-($n$+1)/231-($n$+1), and 230-($n$+2)/231-($n$+2). The columns of memory cells include respective sense amplifiers 208-$n$, 208-($n$+1), and 208-($n$+2) (referred to collectively as the sense amplifiers 208) that can be operated in multiple modes in accordance with embodiments described herein. The memory array 206 and the sense amplifiers 208 can be analogous to the memory array 106 and the sense amplifiers 108 described in association with FIG. 1.

Although FIG. 2 illustrates five word lines 236 (e.g., five rows 234) coupled to a local I/O line (e.g., LIO 238-1 and LIOF 238-2) via three digit lines 230 and three sense amplifiers 208 (e.g., three columns), embodiments can include greater or fewer than five word lines and greater or fewer than three digit lines coupled to a local I/O line. Also, FIG. 2 illustrates the complementary digit line pairs 230-$n$/231-$n$, 230-($n$+1)/231-($n$+1), and 230-($n$+2)/231-($n$+2) in an open digit line architecture; however, embodiments can include a folded digit line architecture, for example.

In this example, the memory array 206 includes 1T1C (one transistor one capacitor) DRAM memory cells with each memory cell including an access device (e.g., a transistor) and a storage element (e.g., a capacitor). In some embodiments, the memory cells can be destructive read memory cells (e.g., reading data stored in a memory cell destroys the data such that the data originally stored in the memory cell is refreshed after being read).

FIG. 2 illustrates an example configuration for the sense amplifiers 208 described herein (illustrated schematically by the sense amplifier 208-$n$). Embodiments of the present disclosure are not limited to the example sense amplifier configuration illustrated by FIG. 2, and can be, for example, a current-mode sense amplifier and/or a single-ended sense amplifier (e.g., a sense amplifier coupled to a single digit line).

Column decoder transistors 232-$n$ and 233-$n$ are coupled to the sense amplifier 208-$n$, column decoder transistors 232-($n$+1) and 233-($n$+1) are coupled to the sense amplifier 208-$n$+1, and column decoder transistors 232-$n$+2 and 233-$n$+2 are coupled to the sense amplifier 208-$n$+2. The columns of memory cells include corresponding respective column decode transistor pairs (e.g., 232-$n$ and 233-$n$, 232-($n$+1) and 233-($n$+1), 232-($n$+2) and 233-($n$+2) (referred to collectively as the column decode transistors of 232 and 233)) that can be operated via respective column decode signals (e.g., ColDec_n, ColDec_(n+1), and ColDec_(n+2), respectively). For example, one or more of the column decode transistors 232 and 233 can be enabled to transfer, via local I/O lines LIO 238-1 and LIOF 238-2, a data value from a corresponding sense amplifier 208 to a component external to the memory array 206, such as the host 102 described in association with FIG. 1.

In some embodiments, the memory array 206 can include one or more subarrays. As used herein, "subarray" refers to a subset of a memory array (e.g., the memory array 206). In some embodiments, rows and columns of a memory array coupled to a local I/O line can correspond to a subarray. For example, the word lines 236-m, 236-(m+1), 236-(m+2), 236-(m+3), and 236-(m+4) and the digit lines 230-n, 230-(n+1), and 230-(n+2), and the memory cells coupled thereto, can correspond to a subarray. The word lines 236-k, 236-(k+1), 236-(k+2), 236-(k+3), and 236-(k+4) and the digit lines 231-n, 231-(n+1), and 231-(n+2), and the memory cells coupled thereto, can correspond to another subarray. In some embodiments, the memory array 206 can be a bank. As used herein, "bank" refers a memory array of a memory device, such as the memory device 104 described in association with FIG. 1.

Although not illustrated by FIG. 2, the local I/O lines LIO 238-1 and LIOF 238-2 can be coupled to one or more I/O lines (e.g., global I/O lines) that provide communication between the memory array 206 and one or more components external to the memory array 206. In some embodiments, a multiplexer can couple multiple local I/O lines of the memory array 206 to a global I/O line. In some embodiments, a multiplexer can be coupled to multiple global I/O lines. For example, eight global I/O lines can be coupled to a multiplexer where each global I/O line coupled thereto provides a respective bit of a byte of data to be transferred to or from the memory array 206.

The sense amplifiers 208 can be electrically connected to the LIO 238-1 via the column decoder transistors 232-n, 232-(n+1), and 232-(n+2). The sense amplifiers 208 can be connected to the LIOF 238-2 via the column decoder transistors 233-n, 233-(n+1), and 233-(n+2). In some embodiments, the column decode transistors 232 and 233 can be coupled to respective sense amplifiers 208 and respective complementary digit line pairs 230-n/231-n, 230-(n+1)/231-(n+1), and 230-(n+2)/231-(n+2) such that disabling one or more of the column decode transistors 232 and 233 electrically connects and disconnects the sense amplifiers 208 from the LIO 238-1 and/or the LIOF 238-2. One or more of the column decode transistors 232 and 233 can be enabled to transfer a signal corresponding to a state (e.g., a logical data value such as logic "0" or logic "1") of a memory cell and/or a logical data value stored by the sense amplifiers 208 to the LIO 238-1 and/or the LIOF 238-2.

The column decoder transistors 232 and 233 can be coupled to a column decoder (e.g., the column decoder 120 described in association with FIG. 1). The sense amplifiers 208 can be electrically connected to the LIO 238-1 and/or the LIOF 238-2 via the column decoder transistors 232 and 233 in association with operating the sense amplifiers 208 in a sense amplifier mode.

The sense amplifiers 208 can be operated to determine a data value (e.g., logic state) stored in a memory cell and/or represented by voltages present on the complementary digit line pairs 230-n/231-n, 230-(n+1)/231-(n+1), and 230-(n+2)/231-(n+2). The sense amplifiers 208 can be operated to perform logical functions. The sense amplifiers 208 can include equilibration circuitry 246 and a latch 247 (e.g., a static latch such as a cross coupled latch). The latch 247 can include a pair of cross coupled n-channel transistors (e.g., NMOS transistors) 243-1 and 243-2 having their respective sources selectively coupled to a reference voltage (e.g., ground). A respective source/drain region of the cross coupled n-channel transistors 243-1 and 243-2 can be coupled to a negative control signal line providing a negative control signal (e.g., RnlF). The cross coupled n-channel transistor 243-1 can have a source/drain region directly coupled to a latch node of the sense amplifiers 208 coupled to the digit lines 230. The cross coupled n-channel transistor 243-2 can have a source/drain directly coupled to a different latch node of the sense amplifiers 208 coupled to the digit lines 231.

The latch 247 can also include a pair of cross coupled p-channel transistors (e.g., PMOS transistors) 242-1 and 242-2. A respective source/drain region of the cross coupled p-channel transistors 242-1 and 242-2 can be coupled to a positive control signal line providing a positive control signal (e.g., ACT). The cross coupled p-channel transistor 242-1 can have a source/drain region directly coupled to a latch node of the sense amplifiers 208 coupled to the digit lines 230. The cross coupled p-channel transistor 242-2 can have a source/drain region directly coupled to a different latch node of the sense amplifiers 208 coupled to the digit lines 231.

A gate of the cross coupled n-channel transistor 243-1 and a gate of the cross coupled p-channel transistor 242-1 can be coupled to the latch node of the sense amplifiers 208 coupled to the digit lines 230. A gate of the cross coupled n-channel transistor 243-2 and a gate of the cross coupled p-channel transistor 242-2 are coupled to the latch node of the sense amplifiers 208 coupled to the digit lines 231.

The equilibration circuitry 246 can be configured to equilibrate the complementary digit line pairs 230-n/231-n, 230-(n+1)/231-(n+1), and 230-(n+2)/231-(n+2). The equilibration circuitry 246 can include a transistor 241 coupled between the complementary digit line pairs 230-n/231-n, 230-(n+1)/231-(n+1), and 230-(n+2)/231-(n+2). The equilibration circuitry 246 can also include transistors 240-1 and 240-2, each having a first source/drain region coupled together. A second source/drain region of the transistor 240-1 can be coupled to the corresponding digit line 230 and a second source/drain region of the transistor 225-2 can be coupled to the corresponding digit line 231. Gates of the transistors 241, 240-1, and 240-2 can be coupled together, and coupled to an equilibration control signal line providing an equilibration control signal (EQ). As such, activating EQ turns on the transistors 241, 240-1, and 240-2, which effectively shorts the complementary digit line pairs 230-n/231-n, 230-(n+1)/231-(n+1), and 230-(n+2)/231-(n+2) together and to an equilibration voltage (e.g., $V_{DD}/2$).

In some embodiments, the transistors 241, 240-1, and 240-2 are n-channel transistors. However, embodiments of the present disclosure are not limited to the transistors of a particular conductivity type. For example, opposite control signals can be used with transistors of opposite conductivity type to implement same sense amplifier functionality.

When a memory cell is being sensed (e.g., read), the voltage on a digit line of one of the complementary digit line pairs 230-n/231-n, 230-(n+1)/231-(n+1), and 230-(n+2)/231-(n+2) can be slightly greater than the voltage on the other digit line of the pair. The ACT signal can then be driven high and the RnlF signal can be driven low to enable one or more of the sense amplifiers 208. The digit line of the pair having the lower voltage will turn on one of the PMOS transistor 242-1 or 242-2 to a greater extent than the other of the PMOS transistor 242-1 or 242-2. As a result, the digit line of the pair having the higher voltage is driven high to a greater extent than the other digit line.

Similarly, the digit line of one of the complementary digit line pairs 230-$n$/231-$n$, 230-($n$+1)/231-($n$+1), and 230-($n$+2)/231-($n$+2) having the higher voltage will turn on one of the NMOS transistor 243-1 or 243-2 to a greater extent than the other of the NMOS transistor 243-1 or 243-2. As a result, the digit line of the pair having the lower voltage is driven low to a greater extent than the other digit line. After a short delay, the digit line of the pair having the greater voltage can be driven to the voltage of the supply voltage (e.g., V$_{DD}$) and the other digit line can be driven to the voltage of the reference voltage (e.g., ground). Therefore, the NMOS transistors 243-1 and 243-2 and the PMOS transistors 242-1 and 242-2 serve as a sense amplifier pair that amplify the voltage differential on the complementary digit line pairs 230-$n$/231-$n$, 230-($n$+1)/231-($n$+1), and 230-($n$+2)/231-($n$+2) and operate to latch a data value sensed from the memory cell.

The sense amplifiers 208 can be used in performance logical AND and OR operations. In some embodiments, to perform a logical AND operation on a set of data stored in a row of memory cells (e.g., the row 234-$k$) coupled to all digit lines on that row and another (e.g., different) set of data stored in a different row of memory cells (e.g., the row 234-$k$+1) coupled to the same digit lines, the row and the different row (e.g., the rows 234-$k$ and 234-$k$+1) can be activated (turned on) along with another row of memory cells (e.g., the row 234-$k$+2) storing all logical "0". Sense amplifiers (e.g., the sense amplifiers 208-$n$, 208-$n$+1, and 208-$n$+2) coupled to the three rows (e.g., the rows 234-$k$, 234-$k$+1, and 234-$k$+2) can be activated (fired) to sense (and store) a result of the logical AND operation. If both the memory cells of the row and the different row (e.g., the rows 234-$k$ and 234-$k$+1) and the memory cells of the other row (e.g., the row 234-$k$+2) are storing a logical "1", then activation of the three rows and the sense amplifiers results in the sense amplifiers sensing a logical "1", which is the result of logical "1" AND logical "1". If either of, or both of, the memory cells of the row and the different row (e.g., the rows 234-$k$ and 234-$k$+1) is storing a logical "0", then activation of the three rows and the sense amplifiers results in the sense amplifiers sensing a logical "0", which is the result of logical "0" AND logical "1", logical "1" AND logical "0", and logical "0" AND logical "0".

In some embodiments, to perform a logical OR operation on a set of data stored in a row of memory cells (e.g., the row 234-$k$) coupled to all digit lines on that row and another set of data stored in a row of memory cells (e.g., the row 234-$k$+1) coupled to the same digit lines, the row and the different row (e.g., the rows 234-$k$ and 234-$k$+1) can be activated (turned on) along with another row of memory cells (e.g., the row 234-$k$+2) storing all logical "1". Sense amplifier (e.g., the sense amplifiers 208-$n$, 208-$n$+1, and 208-$n$+2) coupled to the three rows can be activated (fired) to sense (and store) a result of the logical OR operation. If either of, or both of, the memory cells of the row and the different row (e.g., the rows 234-$k$ and 234-$k$+1) is storing a logical "1", then activation of the three rows and the sense amplifiers results in the sense amplifiers sensing a logical "1", which is the result of logical "0" OR logical "1", logical "1" OR logical "0", and logical "1" OR logical "1". If both the memory cells of the row and the different row (e.g., the rows 234-$k$ and 234-$k$+1) are storing a logical "0", then activation of the three rows and the sense amplifiers results in the sense amplifier sensing a logical "0", which is the result of logical "0" OR logical "0".

Figure 3:
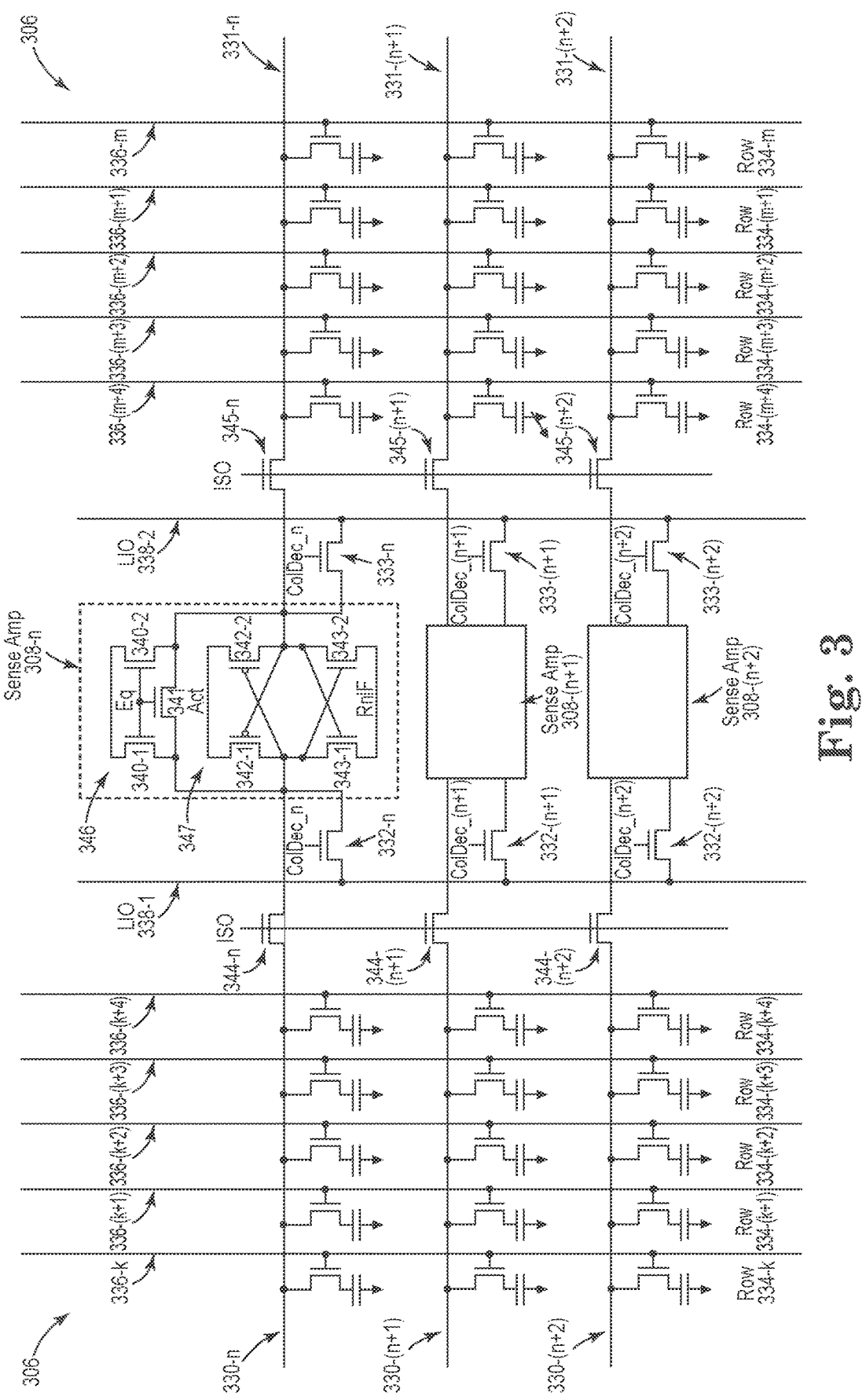
FIG. 3 is a schematic diagram illustrating rows of memory cells of a memory array and sense amplifiers that can serve as a SRAM array in accordance with a number of embodiments of the present disclosure.

FIG. 3 is a schematic diagram illustrating rows 334 of a memory array 306 and sense amplifiers 308 in accordance with a number of embodiments of the present disclosure.

The memory array 306 and the sense amplifiers 308 can be analogous to the memory array 206 and the sense amplifiers 208 described in association with FIG. 2.

FIG. 3 illustrates an embodiment of the present disclosure that differs from the embodiment illustrated by FIG. 2 in that additional transistors 344-$n$, 344-($n$+1), and 344-($n$+2) (referred collectively as the transistors 344) and transistors 345-$n$, 345-($n$+1), and 345-($n$+2) (referred collectively as the transistors 345) are included that are dedicated to isolating the sense amplifiers 308 from capacitance of the digit lines 330 and 331. The sense amplifiers 308 can be isolated (electrically disconnected) from capacitance of the digit lines 330 and 331 via the transistors 344 and 345, respectively, in association with operating the sense amplifiers 308 as a SRAM resource.

Each of the transistors 344 has a source/drain region coupled to a respective one of the digit lines 330 and another source/drain region coupled to one of the sense amplifiers 308 coupled to that digit line. Each of the transistors 345 has a source/drain region coupled to a respective one of the digit lines 331 and another source/drain region coupled to one of the sense amplifiers 308 coupled to that digit line. Gates of the transistors 344 and 345 can be coupled to a signal line by which a control signal "ISO" can be provided.

FIG. 3 illustrates the transistors 344 and 345 being n-channel transistors (e.g., NMOS transistor). Driving the control signal ISO high, for example, can enable the transistors 344 and 345 such that the sense amplifiers 308 are electrically connected to the memory array 306. Driving the control signal ISO low can disable the transistors 344 and 345 such that the sense amplifiers 308 are isolated (electrically disconnected) from capacitance of the digit lines 330 and 331, respectively. However, embodiments of the present disclosure are not limited to any of the transistors 344 and/or 345 being n-channel transistors. For example, the transistors 344 and 345 can be p-channel transistors (e.g., PMOS transistor). In such embodiments, driving the control signal ISO high can disable the transistors 344 and 345 such that the sense amplifiers 308 are isolated (electrically disconnected) from capacitance of the digit lines 330 and 331.

Some embodiments of the present disclosure can include storing data in an array of memory cells (a memory array) having sense amplifiers coupled thereto. The sense amplifiers can be coupled to respective digit line pairs of the array of memory cells. The sense amplifiers can be operated in a first mode in association with sensing the first data stored in the array of memory cells. The sense amplifiers can be operated in a second mode in which the plurality of sense amplifiers serve as a SRAM array. The sense amplifiers can be isolated from the respective digit line pairs in association with operating the sense amplifiers in the second mode. In association with operating the sense amplifiers in the first mode and performing a refresh operation on data stored in the array of memory cells, data can be copied from the sense amplifiers to a row of the array of memory cells, the sense amplifiers can be operated to sense different data, and the different data can be written from the sense amplifiers back to the array of memory cells. Subsequent to performing the refresh operation on the first data, copying the second data from the row of the array of memory cells back to the plurality of sense amplifiers In association with operating the sense amplifiers in the second mode, data, from a host to which the array of memory cells is coupled, can be received by a memory device comprising the array of memory cells and that data can be stored in the sense amplifiers. In association with operating the sense amplifiers in the second mode, the data received from the host can be provided from the sense amplifiers to the host in response to a host command.

In some embodiments, prior to a refresh of the DRAM array, data stored in the sense amplifiers can be written to a row of memory cells of the DRAM array. During the refresh, the sense amplifiers can be connected to digit lines of the memory array. Subsequent to the refresh, the sense amplifiers can sense the data from the row of memory cells and then can be electrically disconnected from the digit lines. The row of memory cells can be associated with an address space of the DRAM array that is dedicated to storage of data transferred from the sense amplifiers during refreshing of the DRAM array.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory array, wherein the memory array comprises a dynamic random access memory DRAM) array; and
a plurality of sense amplifiers coupled to the memory array and configured to:
electrically disconnect from a number of digit lines of the memory array;
when electrically disconnected from the number of digit lines, store first data;
communicate the first data to a processing device external to the memory array and the plurality of sense amplifiers;
receive second data from the processing device; and
when electrically disconnected from the number of digit lines, store the second data.

2. The apparatus of claim 1, wherein the processing device is on-chip with the memory array and the plurality of sense amplifiers.

3. The apparatus of claim 1, wherein the plurality of sense amplifiers are further configured to:
prior to a refresh of the memory array, transfer the first data from the plurality of sense amplifiers to a row of memory cells of the memory array;

sense third data from the memory array in association with the refresh; and
subsequent to the refresh, transfer the first data from the row of memory cells of the memory array to the plurality of sense amplifiers.

4. The apparatus of claim 3, wherein the row of memory cells of the memory array is dedicated to storage of data transferred from the plurality of sense amplifiers during refreshing of the memory array.

5. The apparatus of claim 1, wherein the first or second data represents at least one of a global variable, a stack, or an instruction for the processing device.

6. A method, comprising:
storing first data in an array of memory cells having a plurality of sense amplifiers coupled thereto;
operating the plurality of sense amplifiers in a first mode in association with sensing the first data stored in the array of memory cells; and
operating the plurality of sense amplifiers in a second mode in which the plurality of sense amplifiers serve as a static random access memory (SRAM) array.

7. The method of claim 6, wherein the plurality of sense amplifiers are coupled to respective digit line pairs of the array of memory cells, and
wherein the method further comprises electrically disconnecting the plurality of sense amplifiers from the respective digit line pairs in association with operating the plurality of sense amplifiers in the second mode.

8. The method of claim 7, further comprising, in association with operating the plurality of sense amplifiers in the second mode:
receiving, by a memory device comprising the array of memory cells, second data from a host to which the array of memory cells is coupled; and
storing the second data in the plurality of sense amplifiers.

9. The method of claim 8, wherein the array of memory cells is a dynamic random access memory (DRAM) array, and
wherein the method further comprises, in association with operating the plurality of sense amplifiers in the second mode, providing the second data from the plurality of sense amplifiers to the host in response to a host command.

10. The method of claim 8, further comprising, in association with operating the plurality of sense amplifiers in the first mode and performing a refresh operation on the first data stored in the array of memory cells:
copying the second data from the plurality of sense amplifiers to a row of the array of memory cells;
operating the plurality of sense amplifiers to sense the first data; and
writing the first data from the plurality of sense amplifiers back to the array of memory cells.

11. The method of claim 10, further comprising, subsequent to performing the refresh operation on the first data, copying the second data from the row of the array of memory cells back to the plurality of sense amplifiers.

12. A system, comprising:
a memory device comprising a plurality of banks, each bank comprising a respective memory array coupled to a respective plurality of sense amplifiers; and
a processing device that is on-chip with and coupled to the memory device,
wherein each respective plurality of sense amplifiers is configured to:
in a first mode, electrically disconnect from a number of digit lines of the memory array;

in the first mode, receive first data from the processing device when electrically disconnected from the number of digit lines;

in the first mode, store the first data when electrically disconnected from the number of digit lines;

in the first mode, communicate second data to the processing device when electrically disconnected from the number of digit lines;

in a second mode, electrically connect to the number of digit lines of the memory array; and in the second mode, sense third data from the memory array.

13. The system of claim 12, wherein the memory array comprises a dynamic random access memory (DRAM) array, and wherein each respective plurality of sense amplifiers is further configured to, in the first mode, provide a capability associated with a static random access memory (SRAM) resource.

14. The system of claim 13, wherein each respective plurality of sense amplifiers is further configured to switch from the first mode to the second mode in advance of a refresh of the DRAM array.

15. The system of claim 14, wherein each respective plurality of sense amplifiers is further configured to, in the second mode:

transfer fourth data from the plurality of sense amplifiers to a plurality of memory cells of the DRAM array that is associated with a first address space of the DRAM array; and transfer, in advance of the refresh of the memory array, the first data from the plurality of sense amplifiers to a different plurality of memory cells of the DRAM array that are associated with a second address space of the DRAM array.

16. The system of claim 15, wherein each respective plurality of sense amplifiers is further configured to, in the second mode and subsequent to the refresh, transfer the first data from the different plurality of memory cells of the DRAM array to the plurality of sense amplifiers.

17. The system of claim 15, wherein the second address space is dedicated to storage of data transferred from the plurality of sense amplifiers during refreshing of the DRAM array.

18. The system of claim 11, wherein each respective plurality of sense amplifiers comprises a respective sense amplifier stripe of the plurality of banks.

19. An apparatus, comprising:

a memory array; and a plurality of sense amplifiers coupled to the memory array and configured to:

electrically disconnect from a number of digit lines of the memory array;

when electrically disconnected from the number of digit lines, store first data;

communicate the first data to a processing device external to the memory array and the plurality of sense amplifiers;

receive second data from the processing device; and when electrically disconnected from the number of digit lines, store the second data; and wherein the plurality of sense amplifiers are further configured to:

prior to a refresh of the memory array, transfer the first data from the plurality of sense amplifiers to a row of memory cells of the memory array;

sense third data from the memory array in association with the refresh; and subsequent to the refresh, transfer the first data from the row of memory cells of the memory array to the plurality of sense amplifiers.

20. An apparatus, comprising:

a memory array; and a plurality of sense amplifiers coupled to the memory array and configured to:

electrically disconnect from a number of digit lines of the memory array;

when electrically disconnected from the number of digit lines, store first data;

communicate the first data to a processing device external to the memory array and the plurality of sense amplifiers;

receive second data from the processing device; and when electrically disconnected from the number of digit lines, store the second data; and wherein the plurality of sense amplifiers are further configured to store the first data and the second data so as to provide the processing device with a capability associated with a static random access memory (SRAM) resource coupled to the processing device.

* * * * *